(12) United States Patent
Matsushita et al.

(10) Patent No.: US 11,447,086 B2
(45) Date of Patent: Sep. 20, 2022

(54) VEHICLE OCCUPANT RESTRAINING DEVICE

(71) Applicant: Autoliv Development AB, Vargarda (SE)

(72) Inventors: Tetsuya Matsushita, Kanagawa (JP); Hiroyuki Saito, Kanagawa (JP)

(73) Assignee: Autoliv Development AB, Ogden, UT (US)

( * ) Notice: Subject to any disclaimer, the term of this patent is extended or adjusted under 35 U.S.C. 154(b) by 0 days.

(21) Appl. No.: 17/285,353

(22) PCT Filed: Oct. 15, 2019

(86) PCT No.: PCT/JP2019/040532
§ 371 (c)(1),
(2) Date: Apr. 14, 2021

(87) PCT Pub. No.: WO2020/080374
PCT Pub. Date: Apr. 23, 2020

(65) Prior Publication Data
US 2021/0370861 A1 Dec. 2, 2021

(30) Foreign Application Priority Data
Oct. 15, 2018 (JP) .............................. JP2018-194381

(51) Int. Cl.
*B60R 21/015* (2006.01)
*B60R 21/207* (2006.01)
(Continued)

(52) U.S. Cl.
CPC ...... *B60R 21/01554* (2014.10); *B60R 21/207* (2013.01); *B60R 21/239* (2013.01);
(Continued)

(58) Field of Classification Search
CPC ............ B60R 21/01554; B60R 21/207; B60R 21/2338; B60R 21/239; B60R 21/263;
(Continued)

(56) References Cited

U.S. PATENT DOCUMENTS 6,029,993 A 2/2000 Mueller
6,616,184 B2 * 9/2003 Fischer ................. B60R 21/233
280/743.2
(Continued)

FOREIGN PATENT DOCUMENTS

CN 106687339 A 5/2017
CN 109153363 A 1/2019
(Continued)

OTHER PUBLICATIONS

Computer English translation of JP2009-029182 to Shiro.*
European Search Report dated Apr. 4, 2022 for corresponding European application No. 19873930.2.

*Primary Examiner* — Jonathan Ng
*Assistant Examiner* — Tiffany L Webb
(74) *Attorney, Agent, or Firm* — Harness, Dickey & Pierce, P.L.C.; Stephen T. Olson

(57) ABSTRACT

A vehicle occupant re-straining device, comprising an air bag inflated and deployed on both sides of a vehicle occupant; tension cloth housed so as to extend from the inside of the seat back of a seat into a seat cushion; an angle detection means for detecting the reclining angle of the seat back; and an inner pressure control means for controlling, depending on the reclining angle, pressure in the air bag at the time of inflation and deployment thereof, wherein the tension cloth is deployed on the sides of the seat when the surface material of the seat is broken open by the inflation and deployment of the air bag, thereby holding the surfaces of the air bag, which are located on the opposite sides of the vehicle
(Continued)

occupant, and wherein the inner pressure control means reduces pressure in the air bag.

8 Claims, 10 Drawing Sheets

(51) Int. Cl.
    *B60R 21/263*     (2011.01)
    *B60R 21/16*     (2006.01)
    *B60R 21/2338*     (2011.01)
    *B60R 21/239*     (2006.01)

(52) U.S. Cl.
    CPC ........ B60R 21/2338 (2013.01); B60R 21/263 (2013.01); *B60R 2021/161* (2013.01); *B60R 2021/2076* (2013.01); *B60R 2021/23388* (2013.01)

(58) Field of Classification Search
    CPC .... B60R 2021/161; B60R 2021/23388; B60R 21/26
    See application file for complete search history.

(56) References Cited

U.S. PATENT DOCUMENTS

| | | | | |
|---|---|---|---|---|
| 7,086,663 | B2 * | 8/2006 | Honda | ................ B60R 21/2346 |
| | | | | 280/736 |
| 7,552,942 | B2 * | 6/2009 | Fischer | ............... B60R 21/2338 |
| | | | | 280/739 |
| 8,646,808 | B2 * | 2/2014 | Williams | .............. B60R 21/239 |
| | | | | 280/739 |
| 9,376,086 | B2 * | 6/2016 | Nebel | ................. B60R 21/2338 |
| 10,596,992 | B2 * | 3/2020 | Choi | ..................... B60R 21/216 |
| 10,981,533 | B2 * | 4/2021 | Kobayashi | ........ B60R 21/23138 |
| 2014/0042733 | A1 | 2/2014 | Fukawatase | |
| 2017/0259774 | A1 | 9/2017 | Matsushita et al. | |
| 2019/0111884 | A1 | 4/2019 | Kobayashi et al. | |
| 2020/0010040 | A1 * | 1/2020 | Nakamura | ............ B60R 21/207 |
| 2020/0023800 | A1 * | 1/2020 | Fujii | ...................... B60N 2/002 |
| 2020/0207299 | A1 * | 7/2020 | Cheng | .................. B60R 21/013 |

FOREIGN PATENT DOCUMENTS

| | | |
|---|---|---|
| DE | 19845992 A1 | 5/1999 |
| EP | 3192706 A1 | 7/2017 |
| EP | 3459795 A1 | 3/2019 |
| JP | 200784014 A | 4/2007 |
| JP | 2009-029182 A | 2/2009 |
| JP | 2009-241643 A | 10/2009 |
| JP | 2013-220714 A | 10/2013 |
| JP | 2014-012495 A | 1/2014 |
| JP | 2014-034356 A | 2/2014 |
| JP | 2014-121924 A | 7/2014 |
| KR | 10-2017-0036014 A | 3/2017 |
| KR | 10-2018-0128948 A | 12/2018 |
| WO | 2016/039160 A1 | 3/2016 |
| WO | 2017/199850 A1 | 11/2017 |

* cited by examiner

[FIG. 1]
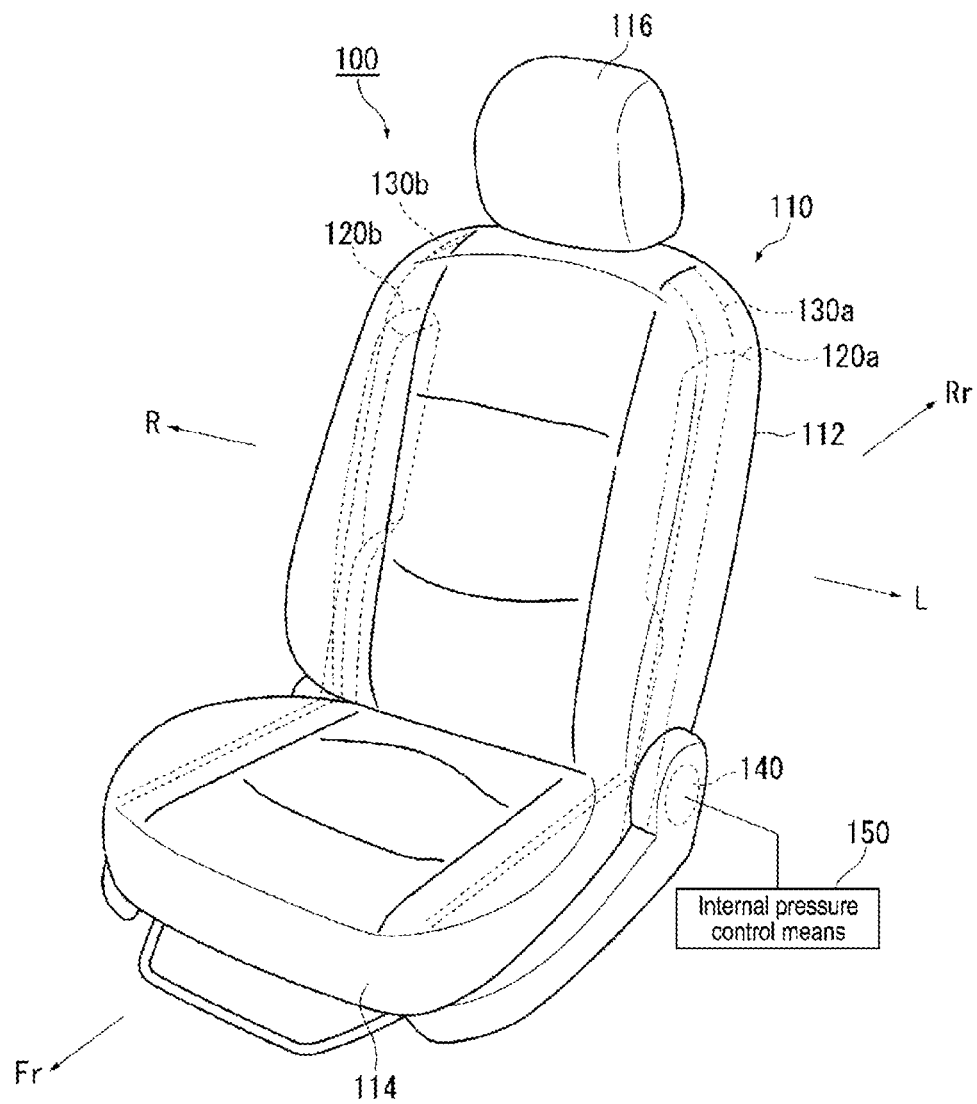

[FIG. 2]
(a)
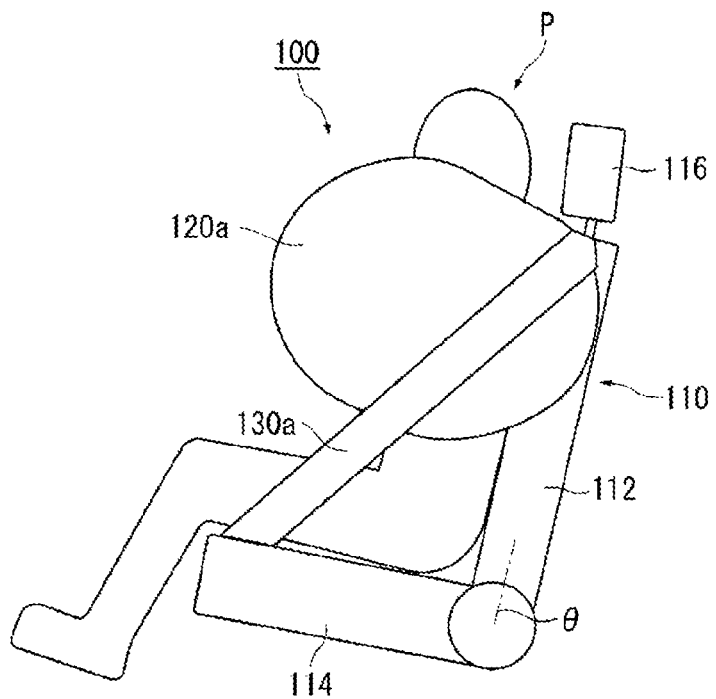
(b)
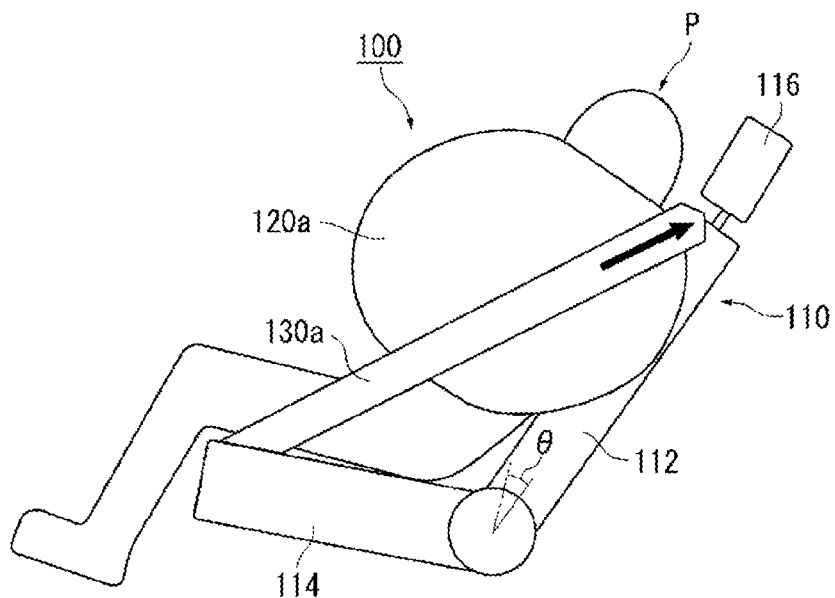

[FIG. 3]
(a)
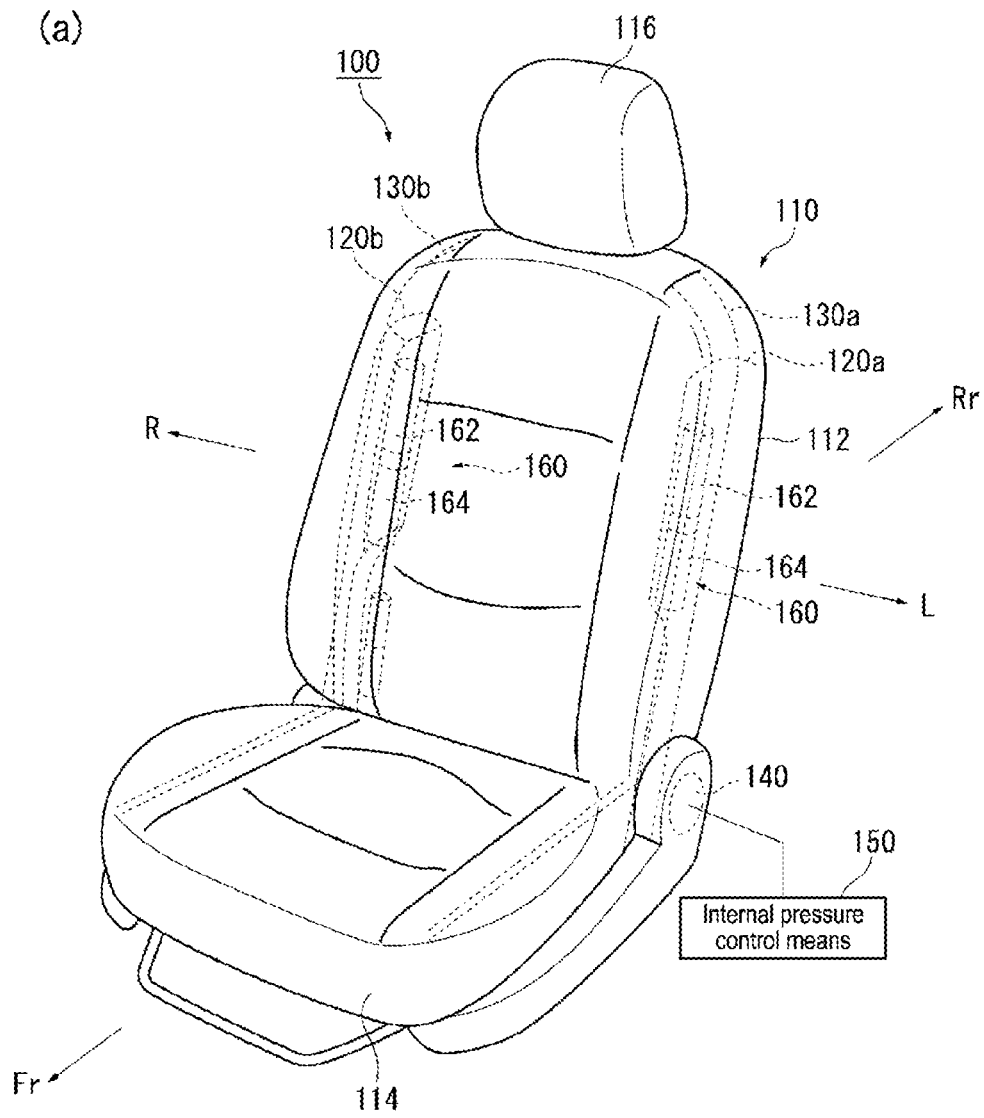
(b)
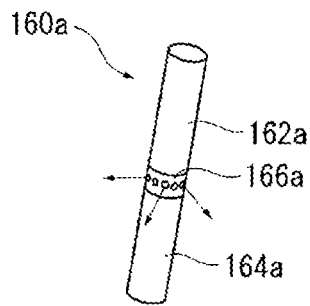
(c)
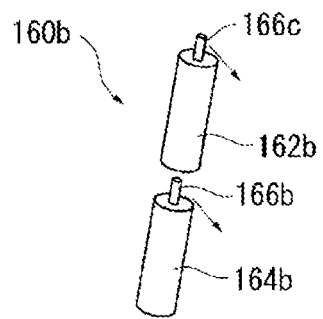

[FIG. 4]
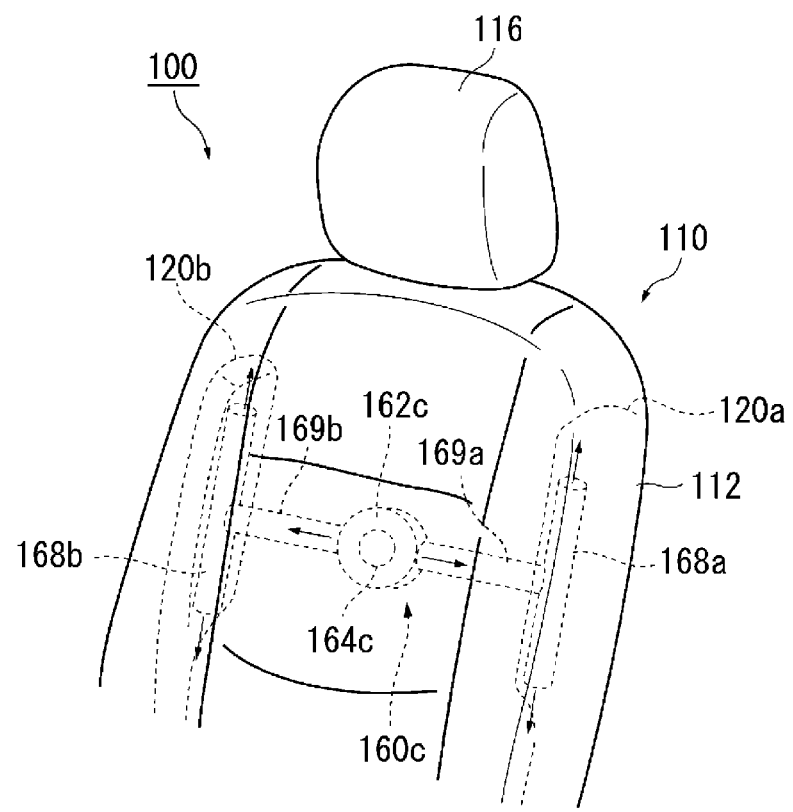

[FIG. 5]
(a)
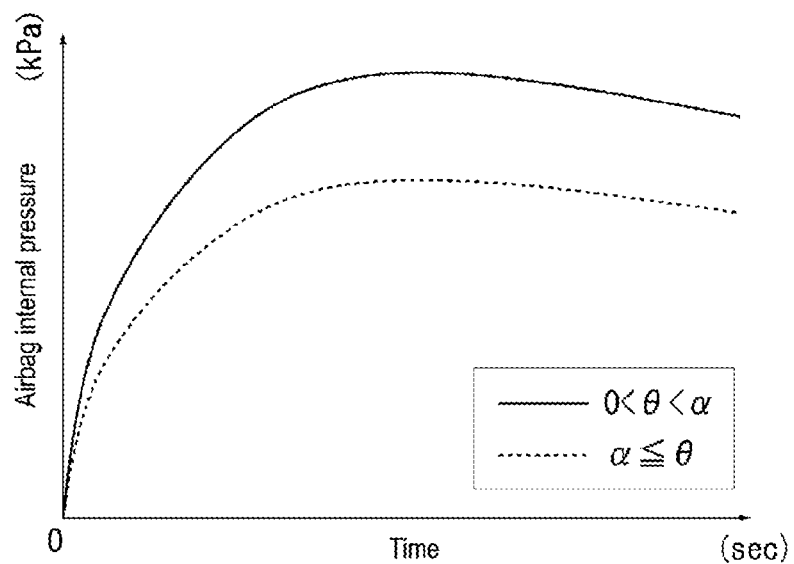
(b)
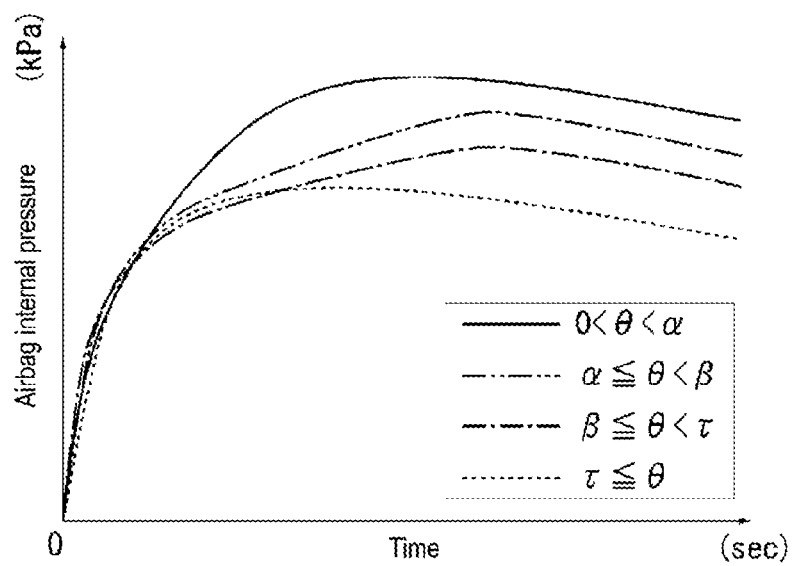

[FIG. 6]
(a)
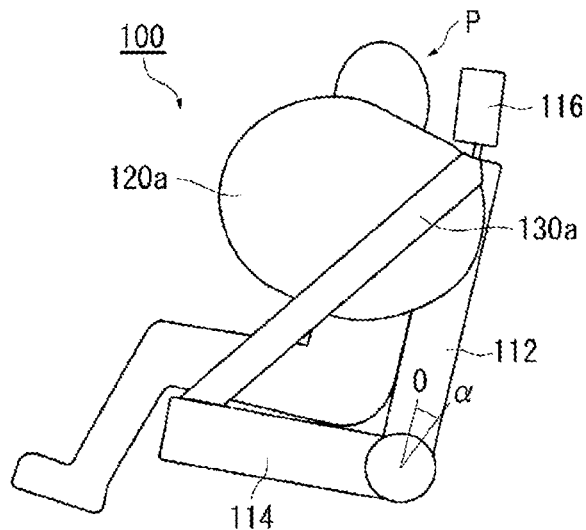
(b)
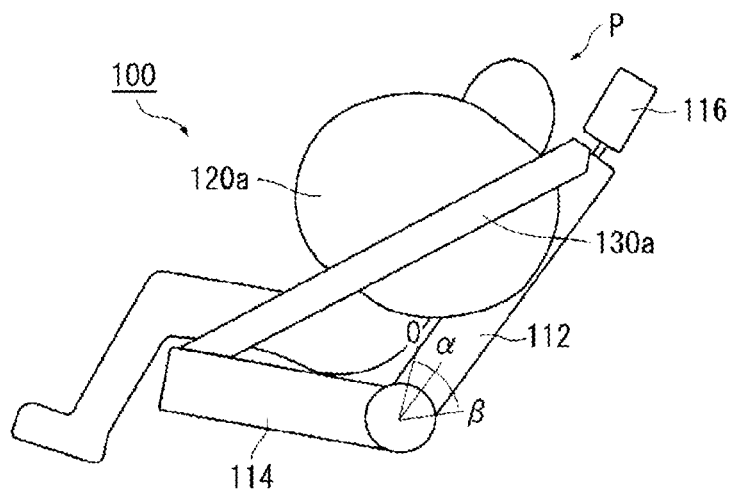
(c)
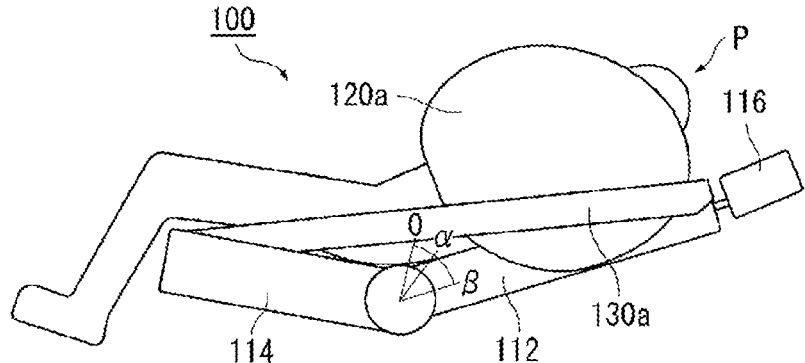

[FIG. 7]
(a)
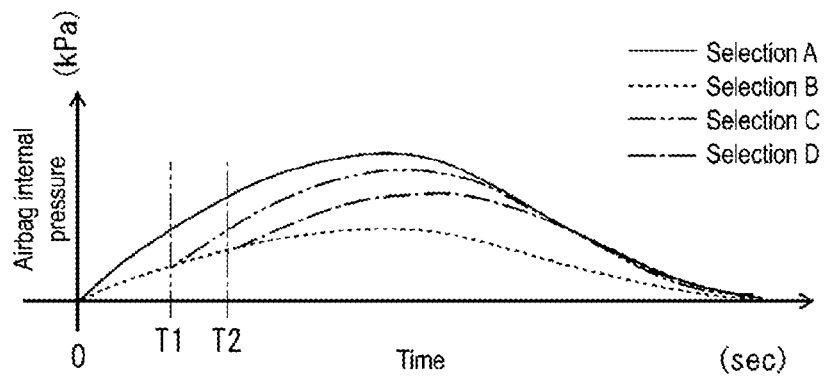
(b)
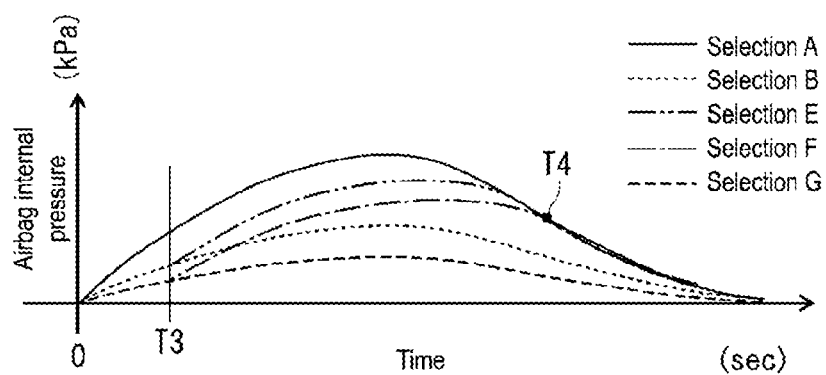

[FIG. 8]
(a)
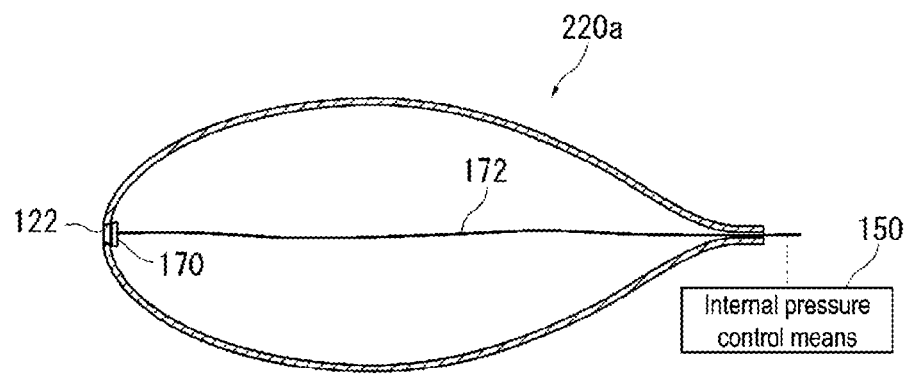
(b)
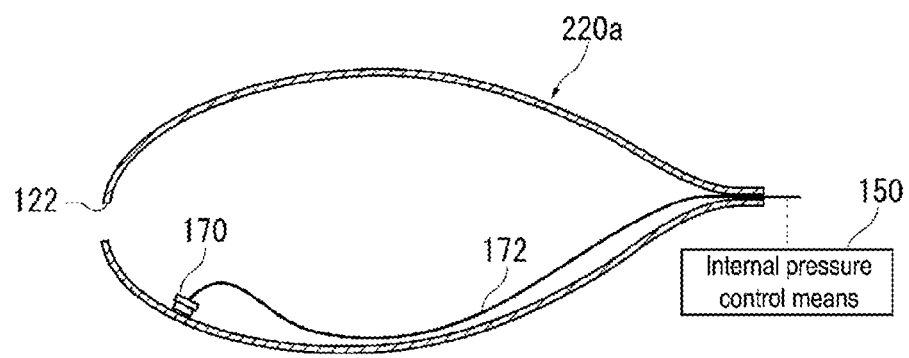

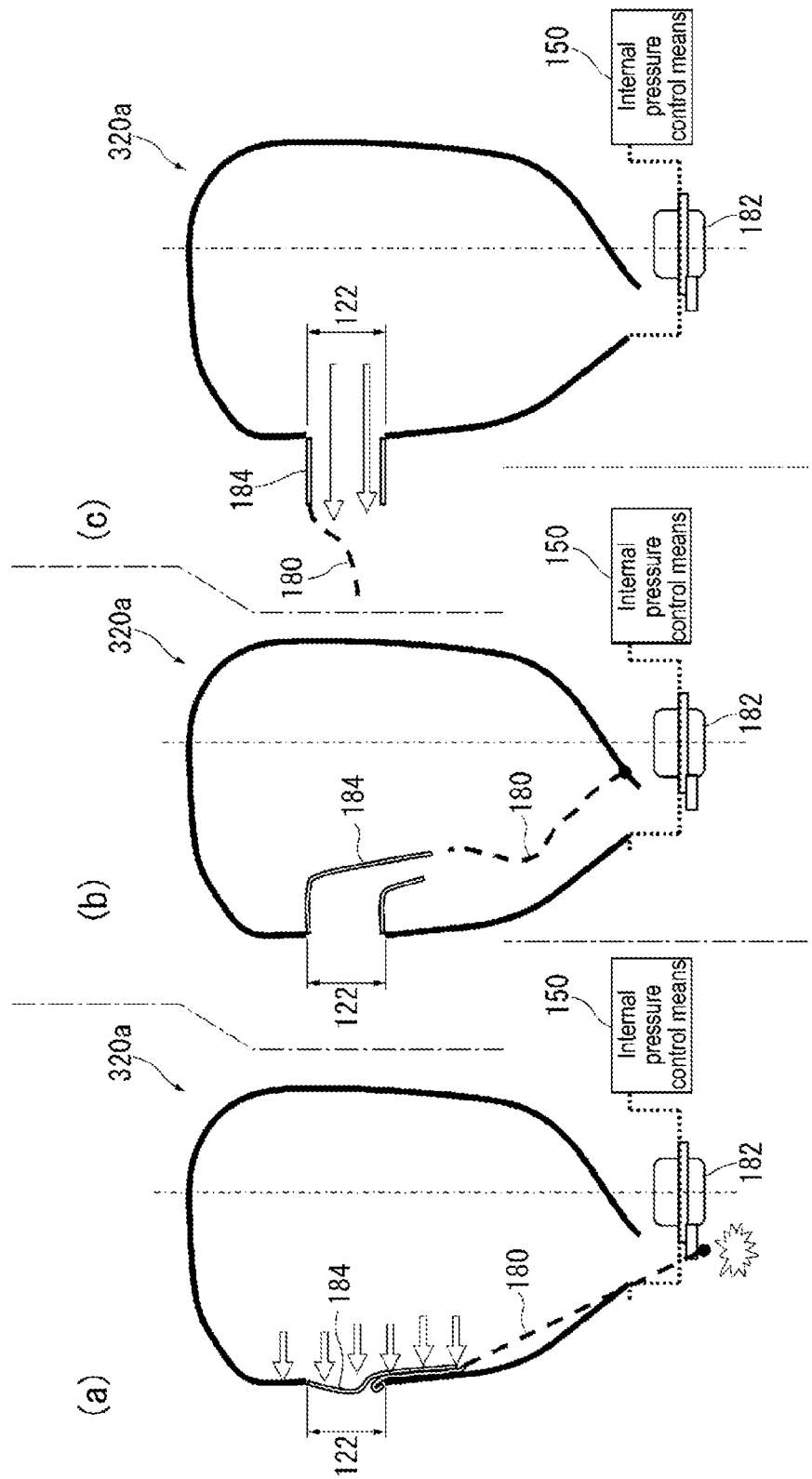

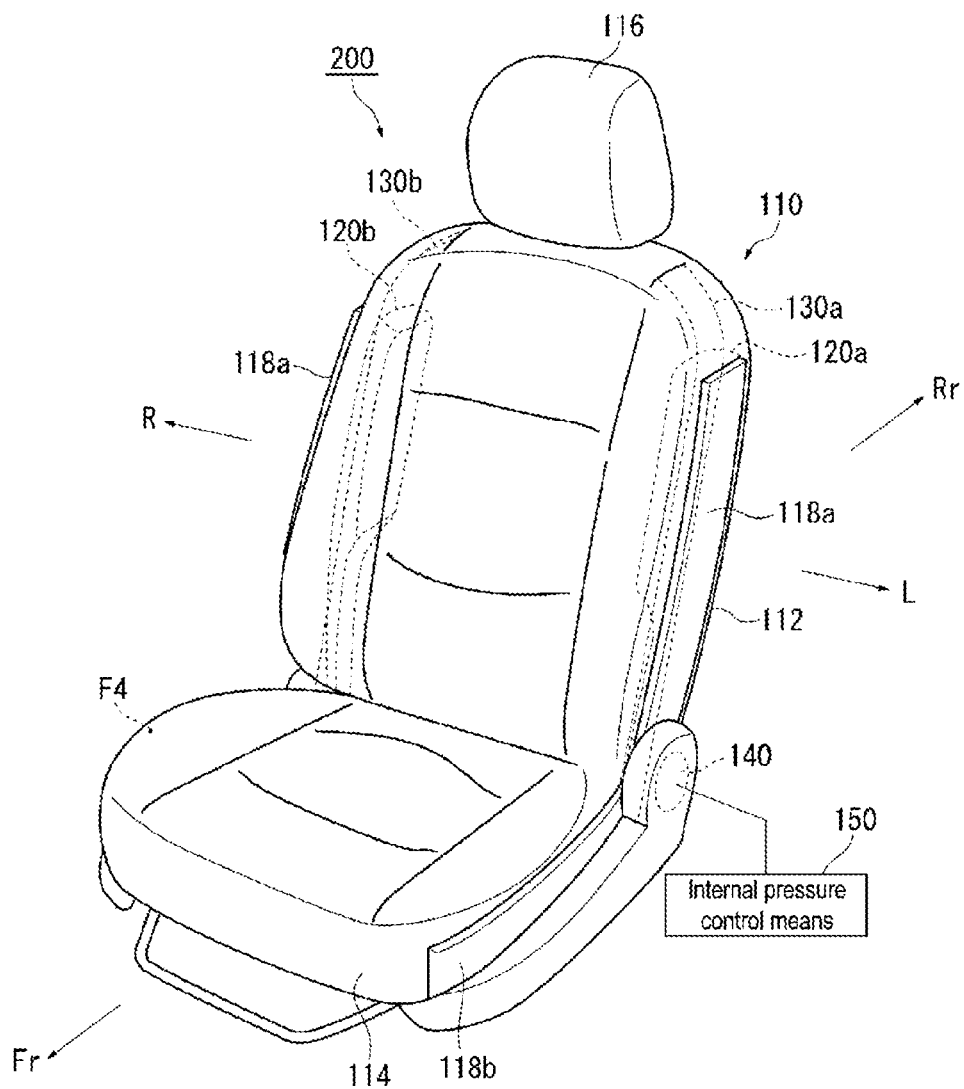
[FIG. 10]

VEHICLE OCCUPANT RESTRAINING DEVICE

TECHNICAL FIELD

The present invention relates to an occupant restraining device that restrains an occupant sitting on a seat of a vehicle.

BACKGROUND

Airbag devices have generally become standard equipment in vehicles in recent years. An airbag device is a safety device which is operated in case of an emergency such as a vehicle collision and, for example, expands and deploys to protect the occupant. There are various types of airbag devices depending on the installation site and application. For example, a side airbag that expands and deploys to the immediate sides of an occupant on both sides of a seat is provided in an occupant restraining device in Patent Document 1.

In particular, in the occupant restraining device of Patent Document 1, a tensile cloth is provided that is tensioned during expansion and deployment of the airbag and extends between both sides of the airbag and the seat cushion. This allows the tensile cloth to restrict movement of the airbag away from the occupant, particularly in the left-right direction. Therefore, occupant restraining performance by the airbag can be further increased.

RELATED ART DOCUMENTS

Patent Documents

[Patent Document 1] WO 2016/039160

SUMMARY OF THE INVENTION

Problem to be Solved by the Invention

The seatback of vehicle seats generally has the capability of tilting, or reclining, relative to the seat cushion. Hereinafter, the state in which the seatback is not reclined (returned fully to a non-reclined position) is called the normal position, and the seatback in a reclined position is called the reclining position.

In a configuration provided with a tensile cloth as in Patent Document 1, the tensile cloth is stretched at an appropriate tension between the seatback and the seat cushion when the seatback is in a normal position. Therefore, the tensile cloth biases the airbag with an appropriate amount of strength, and maintains the internal pressure of the airbag at an appropriate level. In contrast, when the seatback is in the reclined position, the tensile cloth is tightly stretched between the seatback and the seat cushion, and the tension of the tensile cloth becomes high. As a result, the internal pressure of the airbag tightly biased by the tensile cloth will be high, possibly leading to significant load on the occupant.

In light of these issues, an object of the present invention is to provide an occupant restraining device enabling significant reduction of the force of an airbag biased by a tensile cloth on an occupant in the case the seatback is in the reclining position during expansion and deployment of the airbag.

Means for Solving the Problem

In order to resolve the problem described above, a typical configuration of the occupant restraint device according to the present invention is an occupant restraining device for restraining an occupant seated in a seat of a vehicle, comprising:
- an airbag stowed in a seatback of the seat and expanded and deployed to a side of the occupant seated in the seat;
- a tensile cloth stowed from the seatback of the seat to the seat cushion along the stowed airbag on the side opposite the occupant;
- angle detecting means for detecting a reclining angle of the seatback;
- internal pressure control means for controlling internal pressure during expansion and deployment of the airbag according to the reclining angle;
- wherein
- the tension cloth is deployed on the side of the seat by the expansion and deployment of the airbag and is stretched from the seatback to the seat cushion to retain the surface of the airbag on the side opposite the occupant, and
- the internal pressure control means reduces the internal pressure of the airbag if the reclining angle of the seatback is a prescribed angle or more during expansion and deployment of the airbag.

The prescribed angle described above is determined for each vehicle based on the specifications and performance required for each vehicle based on the specifications of the vehicle itself, such as the shape and rigidity, and automobile safety performance evaluation tests, such as the NCAP. This prescribed angle is, for example, an angle at which, during expansion and deployment of the airbag, the tensile cloth causes airbag internal pressure to increase and the load on the occupant to increase such that the effect of injury to the occupant cannot be ignored. This may be in multiple stages depending on the degree of effect. A prescribed angle or more indicates a state in which the seatback is further folded down from the prescribed angle described above. The seatback inclination angle when the seatback is pushed toward the front of the seat and is capable of holding the occupant, and when the seatback is most upright, is set to 0°, and from there, the angle when the seat is tipped backward is viewed as the positive direction (positive number value in the positive direction). Therefore, the inclination angle when the seatback is reclined the most is the highest value.

With the configuration described above, if the reclining angle of the seatback is a prescribed angle or more during expansion and deployment of the airbag, the internal pressure control means reduces the internal pressure of the airbag. Thus, excessive bias of the airbag by the tensile cloth can be suppressed, and the restraining force of the airbag can be adjusted to an appropriate level. Therefore, the load on the occupant by the airbag can be significantly reduced.

The occupant restraining device is provided with a dual inflator comprising first and second inflators that supply gas to the airbag, wherein
- the internal pressure control means controls the internal pressure of the airbag by, of the dual inflator, delaying the gas discharge timing of the second inflator from that of the first inflator. With this type of configuration, the internal pressure of the airbag is reduced compared to the case where the gas discharge timing of the first and second inflators of the dual inflator is the same. Therefore, the effects described above can favorably be obtained.

The occupant restraining device is provided with
- a vent hole formed in the airbag to connect the inside and outside of the airbag, wherein the internal pressure control means controls the internal pressure of said airbag by opening and closing the vent hole. This enables favorable adjustment in the internal pressure of the airbag by closing the vent hole when the seatback is in the normal position and opening the vent hole when the seatback is in the reclined position.

The internal pressure control means described above has a tether arranged in the airbag connected to the vent hole and can open the vent hole by cutting the tether. This enables the vent hole to be reliably opened by cutting the tether.

The tensile cloth described above may be deployed on the side of the seat by breaking the surface skin of the seat. Alternatively, the occupant restraining device may have a case arranged on the side of the seat for stowing the airbag and the tensile cloth, and the tensile cloth may be deployed from the case to the side of the seat. With any of the configurations, the aforementioned effect can be favorably achieved.

Effect of the Invention

With the present invention, an occupant restraining device enabling significant reduction of the load of an airbag biased by a tensile cloth on an occupant in the case the seatback is in the reclining position during expansion and deployment of the airbag can be provided.

BRIEF DESCRIPTION OF THE DRAWINGS

FIG. 1 is a diagram illustrating an occupant restraint device in accordance with embodiment 1 of the present invention.

FIG. 2 is a diagram illustrating a view of an occupant P seated in the seat of FIG. 1 as viewed from the side.

FIG. 3 is a diagram illustrating embodiment 1 of FIG. 1 in more detail.

FIG. 4 is a diagram illustrating another variation of the dual inflator of FIG. 3.

FIG. 5 is a diagram illustrating an internal pressure curve of an airbag during dual inflator control by the internal pressure control means of FIG. 3.

FIG. 6 is a diagram illustrating the reclining position of the seatback of FIG. 1.

FIG. 7 is a diagram illustrating the internal pressure curve of the airbag when the dual inflators are controlled by the internal pressure control means at each reclining posture of FIG. 6.

FIG. 8 is a diagram illustrating an occupant restraining device according to embodiment 2 of the present invention.

FIG. 9 is a diagram illustrating an occupant restraining device according to embodiment 3 of the present invention.

FIG. 10 is a diagram describing another example of this embodiment.

EMBODIMENT OF THE INVENTION

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Note that regarding this embodiment, when an occupant is seated in a seat in a regular posture, the direction the occupant faces is referred to as the front, and the opposite direction is referred to as the rear. Moreover, when the occupant is seated in the seat in a regular posture, the right of the occupant is referred to as the right direction, and the left of the occupant is referred to as the left direction. Furthermore, when the occupant is seated in a regular posture, the direction towards the head of the occupant is referred to as up, and the direction towards the legs of the occupant is referred to as down. In addition, as needed, any diagrams used in descriptions below will indicate the front, rear, left, right, up, and down directions based on the occupant as described above as Fr, Rr, L, R, Up, and Down.

(Occupant Restraining Device)

FIG. 1 is a diagram illustrating an occupant restraining device 100 in accordance with embodiment 1 of the present invention. For ease of understanding, FIG. 1 illustrates the members stowed inside a seat 110 using hidden lines. Furthermore, in FIG. 1, the seat 110 is illustrated with airbags 120a and 120b not expanded and deployed.

The occupant restraining device 100 of the present aspect is a device for restraining an occupant that is seated in the seat 110. The seat 110 includes a seatback 112 that supports the upper body of the occupant. A seat cushion 114 is provided below the seatback 112 on which the occupant sits. A headrest 116 is provided above the seatback 112 that supports the head of the occupant.

As illustrated in FIG. 1, the occupant restraining device 100 of embodiment 1 includes the pair of airbags 120a and 120b, a pair of tensile cloths 130a and 130b, angle detecting means 140, and internal pressure control means 150. As illustrated in FIG. 1, the airbags 120a and 120b (side airbags) are stored in both the left and right sides of the seatback 112 of the seat 110. The airbags 120a and 120b expand and deploy on both sides of the occupant seated in the seat 110 during a collision or the like of the vehicle.

FIG. 2 is a diagram illustrating a view of an occupant P seated in the seat 110 of FIG. 1 as viewed from the side. FIG. 2(a) illustrates the case where the seatback 112 is in the normal position (not reclined at all, or in other words, in a fully upright position), and FIG. 2(b) illustrates the case where the seatback 112 is in the reclined position. Since the left side airbag 120a and the tensile cloth 130a, and the right side airbag 120b and the tensile cloth 130b are symmetrically configured, FIG. 2 is an explanation illustrating the left side airbag 120a and the tensile cloth 130a.

As illustrated in FIG. 1, with the occupant restraining device 100 of the present embodiment, a pair of tensile cloths 130a and 130b are provided for each of the airbags 120a and 120b. The tensile cloths 130a and 130b are respectively stowed from inside the seatback 112 of the seat 110 to in the seat cushion 114 through the side of the stowed pair of airbags 120a and 120b opposite the occupant.

As illustrated in FIGS. 2(a) and 2(b), when the airbag 120a expands and deploys, the tensile cloth 130a deploys along the side of the seat 110 by breaking open the surface skin of the seat 110. Therefore, the tensile cloth 130a is stretched from the seatback 112 to the seat cushion 114, and the surface opposite the occupant P of the airbag 120a is retained by the tensile cloth 130a. Furthermore, the airbag 120a is then biased against the occupant P by the tensile cloth 130a, thereby enhancing the occupant restraining performance of the airbag 120a.

The angle detecting means 140 illustrated in FIG. 1 detects the reclining angle of the seatback 112. Specifically, as illustrated in FIG. 2(*a*), in a normal position where the seatback 112 is not reclined, the reclining angle θ of the seatback 112 is 0. As illustrated in FIG. 2(*b*), in the reclining position where the seatback 112 is inclined with respect to the seat cushion 114, the reclining angle θ of the seatback 112 is a prescribed angle.

As illustrated in FIG. 2(*a*), when the seatback 112 is in a normal position, the tensile cloth 130*a* is stretched at an appropriate tension between the seatback 112 and the seat cushion 114. Therefore, the tensile cloth 130*a* biases the airbag 120*a* with an appropriate amount of force, and maintains the internal pressure of the airbag 120*a* at an appropriate level.

As illustrated in FIG. 2(*b*), when the seatback 112 is in a reclined position, the tensile cloth 130*a* is tightly stretched between the seatback 112 and the seat cushion 114. Here, increase in tension of the tensile cloth 130*a* raises the internal pressure of the airbag 120*a*, which is strongly biased by the tensile cloth 130*a*. Therefore, load on the occupant P while being restrained by the airbag 120*a* may increase.

In addition, with the occupant restraining device 100 of the present embodiment, internal pressure control means 150 is provided to control the internal pressure at the time of expansion and deployment of the airbags 120*a* and 120*b* according to the reclining angle θ. The internal pressure control means 150 decreases the internal pressure of the airbags 120*a* and 120*b* if the reclining angle θ of the seatback 112 is more than a prescribed angle during expansion and deployment of the airbags 120*a* and 120*b*.

With the configuration described above, if the seatback 112 is inclined more than a prescribed angle with respect to the seat cushion 114 during expansion and deployment of the airbags 120*a* and 120*b*, the internal pressure control means 150 reduces the internal pressure of the airbags 120*a* and 120*b*. As a result, the restraining force of the airbags 120*a* and 120*b* can be adjusted to an appropriate level, and the load on the occupant P from the airbags 120*a* and 120*b* can be greatly reduced.

An example of the angle detecting means 140 described above is a rotation angle sensor such as an encoder and the like. By attaching a rotation angle sensor to the rotating portion of the recliner (not shown) of the seat 110, the reclining angle of the seatback 112 can be detected.

Another example of the angle detecting means 140 is an acceleration sensor. An acceleration sensor is mounted to the seatback 112 to measure the distance the seatback 112 moves. Furthermore, by converting the travel distance measured into an angle, the rotation angle of the seatback 112 can be detected. Note, the acceleration sensor is preferably mounted on the upper part of the seatback 112. This enables accurately detecting travel distance of the seatback 112 and thus the reclining angle.

Further, another example of the angle detecting means 140 is a gyro sensor. A gyro sensor is mounted to the seatback 112 to measure angular velocity and acceleration in three dimensions. In addition, by converting these into an angle, the reclining angle of the seatback 112 can be detected. Note, the gyro sensor can also be suitably used to detect the horizontal rotation state (rearward or sideways facing) of the seat 110.

(Airbag Internal Pressure Control by Internal Pressure Control Means)

An example of the internal pressure control of the airbags 120*a* and 120*b* by the internal pressure control means 150 is described below using the drawings. FIG. 3 is a diagram illustrating embodiment 1 of FIG. 1 in more detail. FIG. 3 (*a*) is a diagram illustrating arrangement of dual inflators 160 in the seat 110. FIGS. 3(*b*) and 3(*c*) are diagrams illustrating variations of the dual inflator.

As illustrated in FIG. 3(*a*), in embodiment 1, the occupant restraining device 100 is provided with a dual inflator 160 including a first inflator 162 and a second inflator 164 that supply gas to the airbags 120*a* and 120*b*. The dual inflator 160 is arranged adjacent to the airbags 120*a* and 120*b*. The first inflator 162 is ignited first in an emergency and ignition of the second inflator 164 is delayed from ignition of the first inflator 162.

The dual inflator 160*a,* illustrated in FIG. 3 (*b*) is made up of a single cylindrical member. The first inflator 162*a* and the second inflator 164*a* are separated, and a gas discharge hole 166*a* is formed therebetween. The first inflator 162*a* and the second inflator 164*a* are each filled with a gas generating agent and each has an igniter (not shown) connected thereto.

Furthermore, the gas generating agent filled in the first inflator 162*a* is ignited by the igniter of the first inflator 162*a*. Thus, the gas generating agent filled in the first inflator 162*a* becomes a gas and is ejected from the gas discharge hole 166*a*. After a delay, the igniter of the second inflator 164*a* ignites the gas generating agent filled in the second inflator 164*a*. Thus, the gas generating agent filled in the second inflator 164*a* becomes a gas and is ejected from the gas discharge hole 166*a*.

In the dual inflator 160*b* illustrated in FIG. 3(*c*), the first inflator 162*b* and the second inflator 164*b* each are made up of a separate cylindrical member. In other words, the dual inflator 160*b* of FIG. 3(*c*) has two cylindrical members. The first inflator 162*b* and the second inflator 164*b* are each filled with a gas generating agent and each has an igniter (not shown) connected thereto.

In the dual inflator 160*b* illustrated in FIG. 3(*c*) as well, the gas generating agent of the first inflator 162*b* is ignited first, and gas is discharged from the gas discharge hole 166*c*. Thereafter, ignition of the gas generating agent of the second inflator 164*b* is delayed, and gas is discharged from the gas discharge hole 166*b*. Therefore, with the dual inflator 160*b* as well, gas is supplied to the airbags 120*a* and 120*b* in two stages.

FIG. 4 is a diagram illustrating another variation of the dual inflator of FIG. 3. The dual inflator 160*c* illustrated in FIG. 4 is arranged inside the seatback 112 of the seat 110 and has a first inflator 162*c* and a second inflator 164*c* inside. The first inflator 162*c* and the second inflator 164*c* are separated from each other, and each inflator is filled with a gas generating agent and each has an igniter (not shown) connected thereto. Gas supply tubes 168*a* and 168*b* are provided in the vicinity of the airbags 120*a* and 120*b* to supply gas to the airbags 120*a* and 120*b*. The gas supply tubes 168*a* and 168*b* and the dual inflator 160*c* are connected by connecting tubes 169*a* and 169*b*.

With the dual inflator 160*c* of FIG. 4, the gas generating agent of the first inflator 162*c* is ignited first. Gas is supplied to the gas supply tubes 168*a* and 168*b* through the connecting tubes 169*a* and 169*b*, and supplied to the airbags 120*a* and 120*b* through the gas supply tubes 168*a* and 168*b*. Thereafter, the gas generating agent of the second inflator 164*c* is then ignited after a delay. Gas is supplied to the gas supply tubes 168*a* and 168*b* through the connecting tubes 169*a* and 169*b*, and supplied to the airbags 120*a* and 120*b* through the gas supply tubes 168*a* and 168*b*. This configuration also enables gas to be supplied to the airbags 120*a* and 120*b* in two stages.

FIG. 5 is a diagram illustrating the internal pressure curve of an airbag while the dual inflator 160 is controlled by the internal pressure control means 150 of FIG. 3. FIG. 5(a) illustrates the internal pressure curve of the airbag when the reclining angle θ of the seatback 112 is "0<θ<α" and the internal pressure curve of the airbag when the reclining angle θ of the seatback 112 is "α≤θ". In other words, in FIG. 5(a), the prescribed angle of the reclining angle θ of the seatback 112 is α. The internal pressure control means 150 controls the internal pressure of the airbags 120a and 120b by delaying the gas discharge timing of the second inflator 164 of the dual inflator 160 from that of the first inflator 162 if the reclining angle θ of the seatback 112 is more than a prescribed angle α when the airbags 120a and 120b are expanded and deployed.

When the reclining angle θ of the seatback 112 is "0<θ<α", the internal pressure control means 150 sets the gas discharge timing of the first inflator 162 and the second inflator 164 of the dual inflator 160 to be the same. On the other hand, of the first inflator 162 and second inflator 164 of the dual inflator 160, when the reclining angle θ of the seatback 112 is "α≤θ", the internal pressure control means 150 delays (for example, 100 msec) the gas discharge timing of the second inflator 164.

The tank pressure of the dual inflator 160 when the reclining angle θ of the seatback 112 is "α≤θ" is lower than the tank pressure of the dual inflator 160 when the reclining angle θ is "0<θ<α". As is apparent with reference to FIG. 5(a), when the tank pressure is low, the internal pressure of the airbags 120a and 120b, to which gas is supplied from the tank (not shown) of the dual inflator 160, is naturally also low. Therefore, of the dual inflator 160, delaying the gas discharge timing of the second inflator 164 from that of the first inflator 162 can be understood to be effective in reducing the internal pressure of the airbags 120a and 120b, and thus reducing the load on the occupant P.

FIG. 5(b) illustrates the internal pressure curve of the airbag when the reclining angle θ is divided into four cases: 0<θ<α, α≤θ<β, β≤θ<τ, and τ≤θ, (α<β<τ). In other words, FIG. 5(b) illustrates a case in which three prescribed angles of the reclining angle θ of the seatback 112 are set. Control is provided in stages according to the level of effect on the occupant.

When the reclining angle is "0<θ<α", the gas discharge timing of the first inflator 162 and the second inflator 164 is simultaneous. When the reclining angle is "α≤θ<β", the gas discharge timing of the second inflator 164 is delayed by 30 msec. When the reclining angle is "β≤θ<τ", the gas discharge timing of the second inflator 164 is delayed by 50 msec. When the reclining angle θ is "τ≤θ", the gas discharge timing of the second inflator 164 is delayed by 100 msec. The gas discharge timing described above can be arbitrarily determined based on inflator characteristics and restraint system specifications.

As is apparent in FIG. 5(b), the pressure inside the airbag is reduced as the gas discharge timing of the second inflator 164 is delayed. Thus, it can be understood that a plurality of prescribed angles (threshold values) can be set based on the reclining angle θ, and the internal pressure of the airbags 120a and 120b can be adjusted for each prescribed angle interval.

FIG. 6 is a diagram illustrating a reclined state of the seatback 112 of FIG. 1, and FIG. 6(a) to FIG. 6(c) illustrate an occupant P seated in the seat 110 of FIG. 1 viewed from the side. The seatback 112 of the seat 110 illustrated in FIG. 6(a) has a reclining angle θ of 0<θ<α and is positioned in a driving position.

The seatback 112 of the seat 110 illustrated in FIG. 6(b) has a reclining angle θ of α≤θ<β and is positioned in an intermediate reclined position. The seatback 112 of the seat 110 illustrated in FIG. 6(c) has a reclining angle θ of β≤θ and is positioned at a maximum reclining angle position.

The term "maximum reclining angle" of the present invention in this application does not include a reclining state of a seat such as a "full flat seat (a state in which the seat cushion and the seatback are connected almost horizontally to form a bed-like arrangement of seats)" found in minivans (one-box cars) and the like; rather, indicates the maximum reclining angle of a seatback at which a seat belt can perform a prescribed function for an occupant in a normal seated state while the vehicle is in motion.

FIG. 7 is a diagram illustrating the internal pressure curve of the airbag when the dual inflator 160 is controlled by the internal pressure control means 150 based on each reclining posture of FIG. 6. Selection A, illustrated in FIG. 7(a), is an internal pressure curve of the airbag when the gas discharge timing (ignition timing) of the first inflator 162 and the second inflator 164 are simultaneous. Selection B, illustrated in FIG. 7(a), is the internal pressure curve of the airbag when only the first inflator 162 is ignited.

Selection C, illustrated in FIG. 7(a), is the internal pressure curve of the airbag when the second inflator 164 is ignited at timing T1 after ignition of the first inflator 162. Selection D, illustrated in FIG. 7(a), is the internal pressure curve of the airbag when the second inflator 164 is ignited at timing T2 (timing delayed from timing T1) after ignition of the first inflator 162.

In the occupant restraining device 100 of embodiment 1, the internal pressure control means 150 refers to the reclining angle θ of the seat bag 112 detected by the angle detecting means 140. The internal pressure control means 150 determines the reclining position of the seat bag 112 using the reclining angle θ.

When the internal pressure control means 150 determines that the seatback 112 is in the driving position illustrated in FIG. 6(a), the first inflator 162 and the second inflator 164 are ignited simultaneously. Therefore, the output of the dual inflator 160 reaches maximum output level, as shown in selection A of FIG. 7(a), and the internal pressure of the airbags 120a and 120b reaches a maximum. Therefore, the occupant P seated in a driving position can be securely restrained.

When the internal pressure control means 150 determines that the seatback 112 is in the maximum recline angle position as illustrated in FIG. 6(c), only the first inflator 162 is ignited. Therefore, the output of the dual inflator 160 is at the lowest output level, as shown in selection B of FIG. 7(a), and the internal pressure of the airbags 120a and 120b reaches a minimum. Accordingly, an excessive increase in the internal pressure of the airbags 120a and 120b when the tensile cloths 130a and 130b are stretched from the seatback 112 to the seat cushion 114 is suppressed. This can significantly reduce the load on the occupant P who is seated in the maximum reclining angle position.

In the case where only the first inflator 162 is ignited (when used) as described above, the second inflator 164 should be ignited after the airbags 120a and 120b have completed expansion and deployment and have finished restraining the occupant P (for example, roughly 50 msec later).

When the internal pressure control means 150 determines that the seatback 112 is in an intermediate reclining position (between driving position and maximum reclining angle position) illustrated in FIG. 6(b), the first inflator 162 is ignited first. Thereafter, the internal pressure control means 150 ignites the second inflator 164 after a delay. This results in the pressure inside the airbag of the dual inflator 160 being roughly between selection A and selection B, as illustrated in selection C and selection D. This enables controlling the internal pressure of the airbags 120a and 120b to an appropriate range and to suitably restrain the occupant P seated in an intermediate reclining position.

In particular, in selection C, illustrated in FIG. 7(a), the second inflator 164 is ignited at timing T1. In selection D, the second inflator 164 is ignited at timing T2. Thus, even when the same second inflator 164 is used, the tank pressure of the dual inflator 160 can be varied by varying the timing. Thus, optimizing the output of the dual inflator 160 to a finer degree is feasible.

Selection E, illustrated in FIG. 7(b), uses a high output inflator as the first inflator 162. Selection F, illustrated in FIG. 7(b), uses a low output inflator as the first inflator 162. In selection E and selection F, the second inflator 164 is ignited at timing T3 after ignition of the first inflator 162. Selection G, illustrated in FIG. 7(b), is the internal pressure curve of the airbag when only the first inflator 162 is ignited and a lower output inflator than selection B is used as the first inflator 162.

When a high output inflator is used as the first inflator 162, as in selection E, the tank pressure of the dual inflator 160 is higher than when a low output inflator is used as the first inflator 162, as in selection F. Accordingly, even when the ignition timing of the second inflator 164 is fixed at a prescribed timing, the tank pressure of the dual inflator 160 can be varied. Thus, optimizing the output of the dual inflator 160 to a finer degree is feasible.

Selection B and selection G also use inflators with different outputs as the first inflator 162. It can now be understood that the pressure inside the airbag can be more finely controlled by the output of the inflator, even when only the first inflator 162 is ignited, as can be seen with reference to selection B and selection G.

Note, in the case of igniting the first inflator 162 and the second inflator 164 as in selection A, selection E and selection F, the total amount of gas generating agent of the first inflator 162 and the second inflator 164 in any selection should be the same. This allows the tank pressure of the dual inflator 160 to be the same at a prescribed timing T4 when the ignition timing of the first inflator 162 and the second inflator 164 are different.

FIG. 8 is a diagram illustrating an occupant restraining device according to embodiment 2 of the present invention. In FIGS. 8(a) and 8(b), of the pair of airbags, a cross-sectional view of the left side airbag 220a is illustrated, and members unnecessary for explanation are not illustrated.

In embodiment 2, the vent hole 122 is used to control the internal pressure of the airbag 220a. As illustrated in FIG. 8(a), the airbag 220a has a vent hole 122 that connects the inside and outside of the airbag 220a. A cap 170 is fitted to the vent hole 122, and opening and closing means 172 is connected to the cap 170. The opening and closing means 172 is operated by a signal from the internal pressure control means 150.

In embodiment 2, the internal pressure control means 150 controls the internal pressure of the airbag 220a by opening and closing the vent hole 122. In detail, for example, when the reclining angle θ is "0<θ<α" (the reclining angle θ of the seatback 112 is less than the prescribed angle α), the internal pressure control means 150 does not transmit a signal to the opening and closing means 172. Hereby, the vent hole 122 is kept closed by the cap 170, as illustrated in FIG. 8(a). Therefore, an internal pressure that is appropriate for restraining the occupant P is maintained in the airbag 220a.

On the other hand, if the reclining angle θ of the seatback 112 is "α≤θ" (the reclining angle θ of the seatback 112 is the prescribed angle α or more), the internal pressure control means 150 transmits a signal to the opening and closing means 172. This causes the cap 170 to be removed from the vent hole 122 and the vent hole 122 to be opened, as illustrated in FIG. 8(b). Thereby, an excessive increase in the internal pressure of the airbag 220a can be suppressed. Therefore, suppressing load on the occupant P is feasible.

Although embodiment 2 illustrates a configuration in which opening and closing means 172 is provided, it is not limited thereto. For example, a configuration where the cap 170 is removed from the vent hole 122 when the pressure of the airbag 220a reaches a prescribed pressure is feasible. With this type of configuration, the internal pressure of the airbag 220a increases for an instant, but then the cap 170 is removed and gas escapes to the outside. Accordingly, the internal pressure of the airbag 220a can be reduced.

FIG. 9 is a diagram illustrating an occupant restraining device according to embodiment 3 of the present invention. In FIG. 9 as well, a cross-sectional view of the left side airbag 320a is illustrated, and members unnecessary for explanation are not illustrated. In embodiment 3, internal pressure control of the airbag 320a using the vent hole 122 and a tether 180 is described. Note that descriptions of elements common to embodiment 2 illustrated in FIG. 8 are omitted and the same symbols are affixed.

As illustrated in FIG. 9(a), the vent hole 122 is covered by a cover 184 during expansion and deployment of the airbag 320a, and the tether 180 is connected to the cover 184. A tether cutter 182 is arranged near the end part of the tether 180. The tether cutter 182 is operated by a signal from the internal pressure control means 150.

In embodiment 3, the internal pressure control means 150 opens the vent hole 122 by cutting the tether 180. In detail, when the reclining angle θ of the seatback 112 is "0<θ<α", the internal pressure control means 150 does not transmit a signal to the tether cutter 182. Therewith, the vent hole 122 is kept closed by the cover 184, as illustrated in FIG. 9(a). Therefore, an internal pressure that is appropriate for restraining the occupant is maintained in the airbag 320a.

On the other hand, if the reclining angle θ of the seatback 112 is "α≤θ", the internal pressure control means 150 sends a signal to the tether cutter 182. Therewith, the tether 180 is cut by the tether cutter 182 as illustrated in FIG. 9(b), the cover 184 is removed from the vent hole 122, opening the vent hole 122.

Thereafter, as illustrated in FIG. 9(c), the gas from the airbag 320a flows outwardly through the vent hole 122, pushing the cover 184 and tether 180 outwardly from the airbag 320a. With this configuration, an excessive increase in the internal pressure of the airbag 320a can be suppressed. Therefore, suppressing load on the occupant P is feasible.

Although embodiment 3 illustrates a configuration in which a tether cutter 182 is provided, it is not limited thereto. For example, a configuration where a weak point is formed at a midpoint of the tether 180, and when the pressure of the airbag 320a reaches a prescribed pressure, the tether 180 is broken at the weak point removing the cap 170 from the vent hole 122 is feasible. With this type of configuration, the internal pressure of the airbag 320a increases for an instant, but then the cap 170 is removed and gas escapes to the outside. Accordingly, the internal pressure of the airbag 320a can be reduced.

FIG. 10 is a diagram describing another example of this embodiment. The occupant restraining device 200 illustrated in FIG. 10 includes cases 118a and 118b arranged on the side of the seat 110. Case 118a is the case where airbags 120a and 120b are stowed and case 118b is the case where tensile cloths 130a and 130b are stowed. With the occupant restraining device 200 illustrated in FIG. 10, the tensile cloths 130a and 130b are deployed from the case 118b to the side of the seat 110 during expansion and deployment of the airbags 120a and 120b. This configuration will also provide the same effects as the occupant restraining device 100 described above.

Preferred examples of the present invention were described above while referring to the accompanying drawings. However, the embodiments described above are preferred examples of the present invention, and other embodiments can be implemented or performed by various methods. In particular, unless described otherwise in the specification of the present application, the invention is not restricted to the shape, size, configurational disposition, and the like of parts illustrated in detail in the accompanying drawings. Furthermore, expressions and terms used in the specification of the present application are used for providing a description, and the invention is not limited thereto, unless specifically described otherwise.

Therefore, it is obvious that a person with ordinary skill in the art can conceive of various changed examples or modified examples within the scope described in the scope of the claims, which is understood to naturally belong to the technical scope of the present invention.

INDUSTRIAL APPLICABILITY

The present invention can be used in an occupant restraining device that restrains an occupant sitting on a seat of a vehicle.

EXPLANATION OF CODES

100 . . . occupant restraining device, 110 . . . seat, 112 . . . seatback, 114 . . . seat cushion, 116 . . . headrest, 118a, 118b . . . case, 120a, 220a, 320a . . . airbag, 120b . . . airbag, 122 . . . vent hole, 130a . . . tensile cloth, 130b . . . tensile cloth, 140 . . . angle detecting means, 150 . . . internal pressure control means, 160, 160a, 160b, 160c . . . dual inflator, 162, 162a, 162b, 162c . . . first inflator, 164, 164a, 164b, 164c . . . second inflator, 166a, 166b, 166c . . . gas discharge holes, 168a, 168b . . . gas supply tubes, 169a, 169b . . . connecting tubes 169b . . . connecting tubes 170 . . . cap, 172 . . . opening and closing means, 180 . . . tether, 182 . . . tether cutter, 200 . . . occupant restraining device, P . . . occupant

The invention claimed is:

1. An occupant restraining device that restrains an occupant sitting on a seat of a vehicle, the occupant restraining device comprising:
   an airbag stowable in a seatback of the seat for expansion and deployment to a side of an occupant seated in the seat;
   an angle detecting means that detects a reclining angle of the seatback;
   internal pressure control means for controlling an internal pressure of the airbag during expansion and deployment according to the reclining angle; and
   first and second inflators for supplying gas to the airbag,
   wherein the internal pressure control means is operative to decrease the internal pressure of the airbag if the reclining angle of the seatback is more than a prescribed angle during expansion and deployment of the airbag, and
   wherein the internal pressure control means controls the internal pressure of the airbag by delaying gas discharge timing of the second inflator from that of the first inflator.

2. The occupant restraining device according to claim 1, comprising:
   a case in which the airbag is stowed, the case attachable to a side of the seat.

3. The occupant restraining device according to claim 2 in combination with the seat of the vehicle, the case attached to the side of the seat.

4. The occupant restraining device according to claim 1, further comprising a tensile cloth stowable from within the seatback of the seat to within a seat cushion of the seat along a side of the airbag, wherein the tensile cloth is deployable by expansion and deployment of the airbag by breaking a surface skin of the seat, and is stretchable from the seatback to a seat cushion to retain a surface of the airbag.

5. The occupant restraining device according to claim 1, wherein the angle detecting means is a rotation angle sensor.

6. The occupant restraining device according to claim 1, wherein the angle detecting means is an acceleration sensor.

7. The occupant restraining device according to claim 1, wherein the angle detecting means is a gyro sensor.

8. The occupant restraining device according to claim 1 in combination with the seat of the vehicle, the airbag stowed within the seatback.

* * * * *